(12) United States Patent
Hemphill et al.

(10) Patent No.: US 6,802,954 B1
(45) Date of Patent: Oct. 12, 2004

(54) CREATION OF POROUS ANODE FOIL BY MEANS OF AN ELECTROCHEMICAL DRILLING PROCESS

(75) Inventors: Ralph Jason Hemphill, Liberty, SC (US); Thomas V. Graham, Greenville, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 186 days.

(21) Appl. No.: 10/199,846

(22) Filed: Jul. 18, 2002

(51) Int. Cl.$^7$ ................................................ B23H 11/00
(52) U.S. Cl. ..................... 205/640; 205/112; 205/674; 205/685; 205/324; 205/666
(58) Field of Search ................................. 205/112, 640, 205/674, 685, 324, 666; 216/6, 33, 47

(56) References Cited

U.S. PATENT DOCUMENTS

| | | | |
|---|---|---|---|
| 3,779,877 A | | 12/1973 | Alwitt |
| 4,518,471 A | | 5/1985 | Arora |
| 4,525,249 A | | 6/1985 | Arora |
| 4,671,858 A | * | 6/1987 | Kunugihara et al. .......... 205/87 |
| 5,131,388 A | | 7/1992 | Pless et al. |
| 5,522,851 A | | 6/1996 | Fayram |
| 5,584,890 A | | 12/1996 | MaFarlane et al. |
| 5,660,737 A | | 8/1997 | Elias et al. |
| 5,901,032 A | * | 5/1999 | Harrington et al. ......... 361/500 |

FOREIGN PATENT DOCUMENTS

WO     WO 00/19470     9/1999

OTHER PUBLICATIONS

Provenier, et al.; The Automatic Mode Switch Function in Successive Generations of Minute Ventilation Sensing Dual Chamber Rate Responsive Pacemakers; Pace, vol. 17; Nov. 1994; Part II; pp. 1913–1919.

Telectronics Pacing Systems; META DDDR Model 1250 H Multiprogrammable, Minute Ventilation Rate Responsive Pulse Generator with Telemetry Physician's Manual; pp. i–82, no date.

* cited by examiner

Primary Examiner—Wesley A. Nicolas
(74) Attorney, Agent, or Firm—Steven M. Mitchell

(57) ABSTRACT

The present invention is directed to a method of creating porous anode foil for use in multiple anode stack configuration electrolytic capacitors, producing a pore structure that is microscopic in pore diameter and spacing, allowing for increased energy density with a minimal increase in ESR. Initially, an anode metal foil is etched, according to a conventional etch process, to produce an enlargement of surface area. The etched foil is then placed into the electrochemical drilling solution of the present invention. Alternatively, the etched foil may be masked, so that only small areas of the etched foil are exposed, prior to being placed in the electrochemical drilling solution. A DC power supply is used to electrochemically etch the masked or unmasked foil in the electrochemical drilling solution of the present invention such that pores on the order of a few microns diameter are produced through the foil. The electrochemical drilling solution of the present invention consists of 1 to 15% by weight sodium chloride, preferably 5% by weight, and 10 to 5000 PPM of a surface passivator, such as sodium nitrate or phosphoric acid, preferably 500 PPM. Finally, the foil pores are widened and the foil is formed to the intended use voltage according to conventional widening and forming processes. When used in conjunction with an electrochemical etch preceding it and an electrochemical widening step following it, the electrochemical drilling step of the present invention results in an electrically porous foil which maintains the high capacitance gain produced by the etching and widening steps alone, but, when used in a multiple anode stack configuration, exhibits a reduced equivalent series resistance.

20 Claims, 4 Drawing Sheets

CREATION OF POROUS ANODE FOIL BY MEANS OF AN ELECTROCHEMICAL DRILLING PROCESS

BACKGROUND OF THE INVENTION

1. Field of the Invention

The present invention is directed to a method of etching anodic foil for use in the manufacture of electrolytic capacitors and more particularly to a method of creating porous anode foil for use in multiple anode stack configuration electrolytic capacitors. The resulting foil reduces the equivalent series resistance (ESR) of multiple anode stack configurations without sacrificing capacitance. The invention further relates to an electrolytic capacitor incorporating the etched anode foil of the present invention for use in an implantable cardioverter defibrillator (ICD).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. Energy storage density can be increased by using a multiple anode stack configuration element, however, the drawback is that the equivalent series resistance, ESR, of the capacitor increases as the conduction path from cathode to anode becomes increasingly tortuous. To charge and discharge the inner anodes (furthest from the cathode) charge must flow through the outer anodes. With typical anode foil, the path through an anode is quite tortuous and results in a high ESR for a multiple anode stack configuration.

The conduction path from the cathode to the inner anodes may be made less tortuous by providing pores in the outer anode foil. In this manner, charge can flow directly through the outer anodes to the inner anodes. Thus, the use of porous anode foil can combat the increase in ESR resulting from the use of a multiple anode stack configuration. However, the type of pore structure in the anode foil affects the resulting ESR. A macroscopic pore size and spacing, such as can be obtained by mechanical means, as shown in PCT Published Application WO 00/19470, is not as desirable for the reduction of ESR. This type of structure reduces the capacitance of the anode foil and is not optimal in reduction of ESR. Therefore, there is a need in the art for a method of creating porous anode foil for use in multiple anode stack configuration electrolytic capacitors that minimizes ESR while maintaining high capacitance.

SUMMARY OF THE INVENTION

The present invention is directed to a method of creating porous anode foil for use in multiple anode stack configuration electrolytic capacitors, producing a pore structure that is microscopic in pore diameter and spacing, allowing for increased energy density with a minimal increase in ESR. The etched anode foil is made porous to the fill electrolyte by subjecting the etched anode foil to an electrochemical drilling solution which selectively etches pores though the foil. The method according to the present invention produces anode foil with improved porosity which may be used in a multiple anode stack configuration electrolytic capacitor allowing for increased current density without an excessive ESR increase.

A three step etch process is used according to the present invention. Initially, an anode metal foil is etched, according to a conventional etch process, to produce an enlargement of surface area, preferably and enlargement of at least 20 times. The etched foil is then placed into the electrochemical drilling solution of the present invention. Alternatively, the etched foil may be masked, so that only small areas of the etched foil are exposed, prior to being placed in the electrochemical drilling solution. A DC power supply is used to electrochemically etch the masked or unmasked foil in the specialized electrochemical drilling solution such that pores on the order of about 1 micron to about 1000 microns in diameter are produced through the foil increasing its porosity, to provide a significant reduction of ESR in the final multiple anode stack configuration capacitor build. The electrochemical drilling solution of the present invention consists of 1 to 15% by weight sodium chloride, preferably 5% by weight, and 10 to 5000 PPM of a surface passivator, such as sodium nitrate or phosphoric acid, preferably 500 PPM. Finally, the foil is widened and formed to the intended use voltage according to conventional widening and forming processes. As used herein, the phrase "widening the foil" is intended to mean widening the pores that were generated in the foil during etching and/or drilling processes. When used in conjunction with an electrochemical etch preceding it and an electrochemical widening step following it, the electrochemical drilling process of the present invention results in an electrically porous foil which maintains the high capacitance gain produced by the etching and widening steps alone, but, when used in a multiple anode stack configuration, exhibits a reduced equivalent series resistance.

The anode foil of the present invention is suitable for use in an electrolytic capacitor with a multiple anode stack or wound roll configuration, after forming a barrier oxide sufficiently thick to support the intended use voltage. The electrochemical drilling step of the present invention produces a pore structure in the anode foil which is microscopic in pore diameter and spacing.

BRIEF DESCRIPTION OF THE DRAWINGS/FIGURES

The foregoing and other features and advantages of the invention will be apparent from the following, more particular description of a preferred embodiment of the invention, as illustrated in the accompanying drawings.

DETAILED DESCRIPTION OF THE INVENTION

Figure 1:
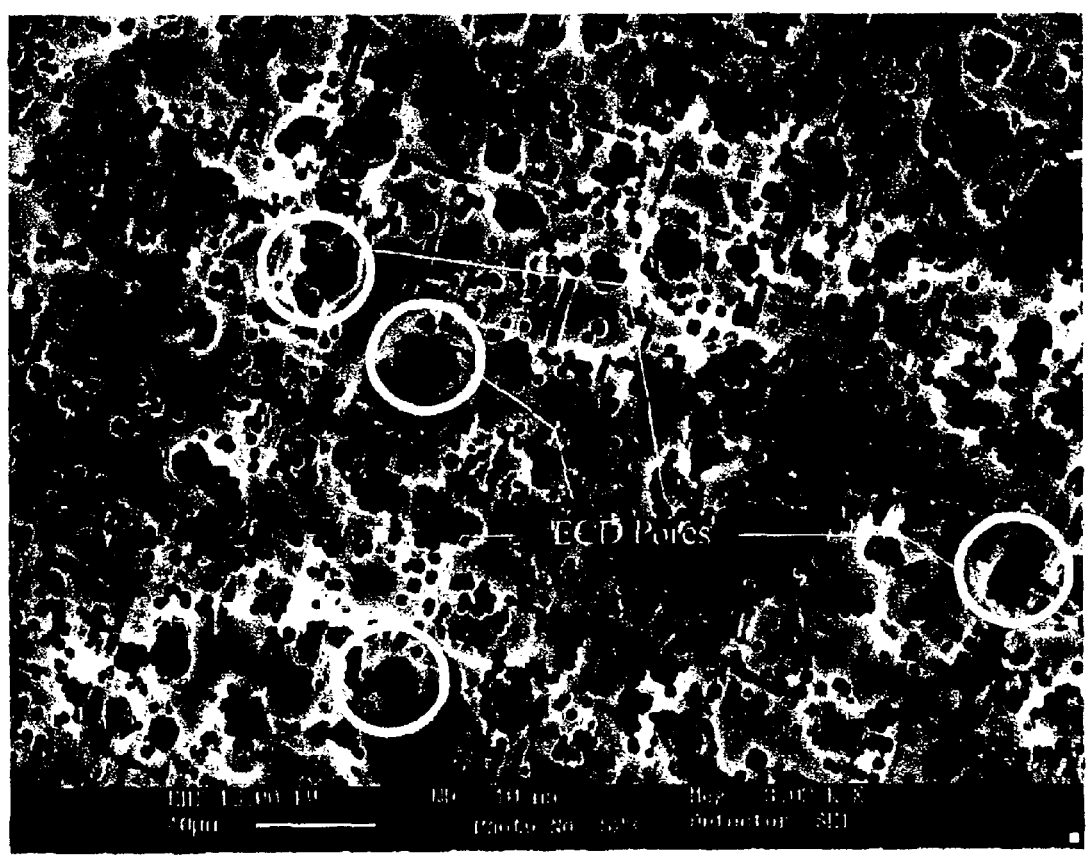
FIG. 1 is an SEM photograph of the surface of an electrochemically drilled anode foil according to one embodiment of the present invention.

The present invention is directed to a method of creating porous anode foil for use in multiple anode stack configuration electrolytic capacitors in order to reduce the equivalent series resistance (ESR) of such multiple anode stack configurations without sacrificing capacitance and to an electrolytic capacitor incorporating the etched anode foil of the present invention for use in an implantable cardioverter defibrillator (ICD). According to the three step etch process of present invention, initially, a metal foil is etched to produce an enlargement of surface area; then the etched foil is then placed into the electrochemical drilling solution of the present invention and a DC power supply is used to electrochemically etch the etched foil in the electrochemical drilling solution to produce pores on the order of about 1 micron to about 1000 microns in diameter through the foil, increasing its porosity; and finally, the foil pores are widened and the foil is formed to the intended use voltage according to conventional widening and forming processes.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

According to the present invention, an anode metal foil to be etched is selected. Aluminum foil is preferred, because of its ability to produce a sufficient quality oxide layer, its conductive properties, and its wide commercial availability. However, other foils conventionally utilized in electrolytic capacitors could also be used, including tantalum, magnesium, titanium, niobium, zirconium and zinc. Preferably, a 100 to 125 micron thick, unetched, high purity (at least 99.98%) strip of aluminum foil with high cubicity, wherein at least 80% of the crystalline aluminum structure is oriented in a normal position (i.e., a (1,0,0) orientation) relative to the surface of the foil, is used. Such foils are well-known in the art and are readily available from commercial sources.

Initially, the aluminum foil is etched, according to a conventional etch process, as known to those skilled in the relevant art, to produce an enlargement of the surface area of the foil. Surface area of the foil is increased by electrochemically removing portions of the foil to create etch tunnels, as disclosed in U.S. Pat. Nos. 4,474,657, 4,518,471, 4,525,249 and 5,715,133. Since the capacitance of an electrolytic capacitor increases with the surface area of its electrodes, increasing the surface area of the anode foil results in increased capacitance per unit volume of the electrolytic capacitor. By electrolytically etching an anode foil, an enlargement of a surface area of the foil will occur. Electrolytic capacitors which are manufactured with such etched foils can obtain a given capacity with a smaller volume than an electrolytic capacitor which utilizes a foil with an unetched surface.

In a preferred embodiment, the aluminum foil is etched in a high temperature etch electrolyte that is based on a halide and/or oxyhalide, preferably a chloride and/or oxychloride, and contains an oxidizer such as peroxide, persulfate, cerium sulfate or sodium periodate, at a pH of about 0.0 to about 8.0, preferably a pH of about 1.0 to about 3.0. Other surface area enhancing etch solutions can be used with the present invention to produce similar results. In the preferred embodiment, the electrolyte etch solution consists of about 1.3% by weight NaCl and about 3.5% by weight $NaClO_4$. The electrolyte is heated to a temperature of about 80° C. to about 100° C., with a preferred temperature of about 85° C. The foil is placed in the etch electrolyte and etched at a current density of about 0.1 to about 0.3 amps/cm$^2$, preferably about 0.15 amps/cm$^2$, and at an etch charge of about 5 to about 50 Coulombs/cm$^2$ for a specific amount of time, preferably about 36 Coulombs/cm$^2$ for about 4 minutes. In the preferred embodiment, the foil is etched to produce an enlargement of surface area of at least 20 times.

The etched foil is then placed into the electrochemical drilling solution of the present invention at a temperature from about 40° C. to about 100° C., preferably about 95° C. The electrochemical drilling solution of the present invention consists of about 1 to about 15% by weight sodium chloride, preferably about 5% by weight, and about 10 to about 5000 PPM of a surface passivator, preferably about 500 PPM. The preferred surface passivator is sodium nitrate, but can be any alkali metal salt of nitrate, phosphoric acid or the alkali metal salts of phosphate, and any of the soluble silicates, such as sodium silicate and potassium silicate, and the alkali metal salts of sulfate. The surface passivator helps to protect the foil surface and concentrate the current density from the power supply to smaller areas for tunnel formation. The concentrated current density creates more "through" type tunnels.

An appropriate amount of electrochemical drilling produces a microscopic pore diameter and spacing which reduces ESR significantly. A DC power supply is used to electrochemically drill the foil at a constant current density and for a time of about five seconds to about 15 minutes, preferably about 2 minutes, at a temperature from about 40° C. to about 100° C., preferably about 95° C. The applied current density should be from about 0.1 to about 1.0 amp/cm$^2$, preferably about 0.2 amps/cm$^2$. The etch charge is varied from about 1 Q/cm$^2$ to about 50 Q/cm$^2$, preferably 18 Q/cm$^2$, to produce the desired number and size of electrochemically drilled holes.

Figure 2:
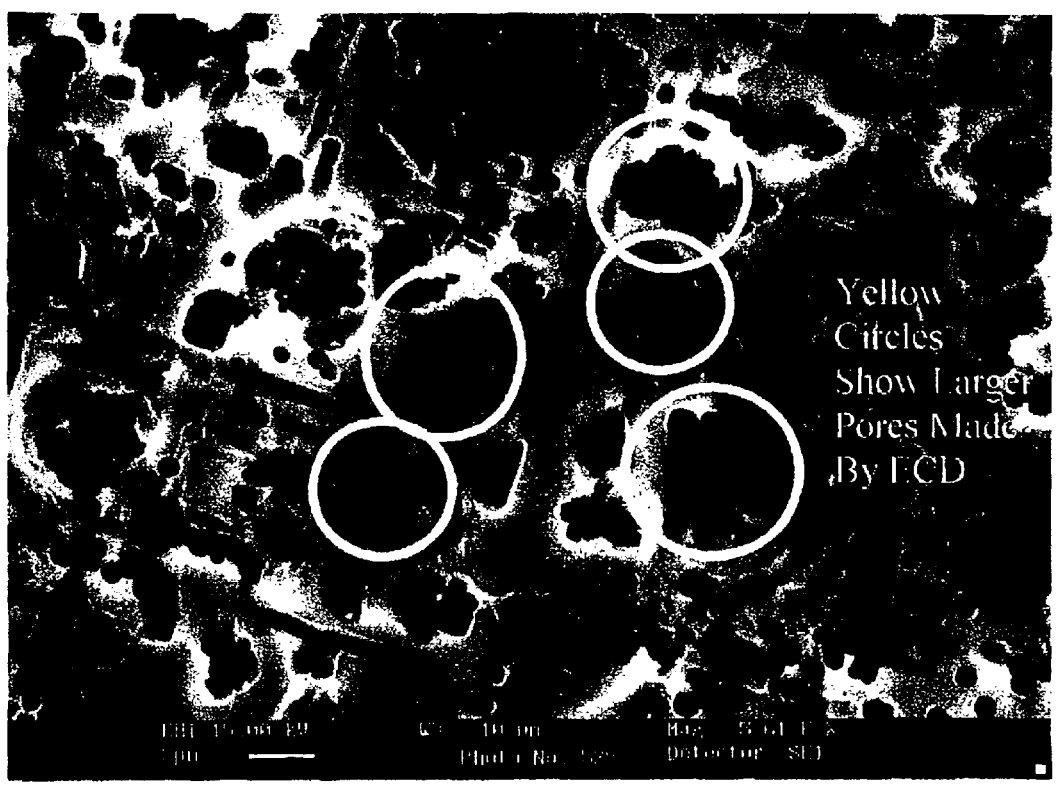
FIG. 2 is an SEM photograph of the surface of an electrochemically drilled anode foil according to another embodiment of the present invention.

Preferably, the resulting pore size is about 1 micron to about 1000 microns in diameter with pore to pore spacing of about 1 micron to about 100,000 microns, more preferably about 3 microns in diameter with spacing of about 15 microns between pore centers. FIG. 1 and FIG. 2 are SEM photographs of anode foil surfaces electrochemically drilled according to an embodiment of the present invention. Pores produced by the electrochemical drilling process are indicated by the circled portions in FIG. 1 and FIG. 2.

In an alternative embodiment of the present invention, the etched foil can be masked so that only small areas of the etched foil are exposed to the electrochemical drilling solution. In one embodiment, the etched foil is held between two masks with a grid of openings which expose the masked foil. The masked foil is then placed into the electrochemical drill solution and a DC power supply is used, as discussed above, to further electrochemically etch the exposed areas of the foil. The electrochemical drill is allowed to continue until the appropriate pore size has been created.

Figure 3A:
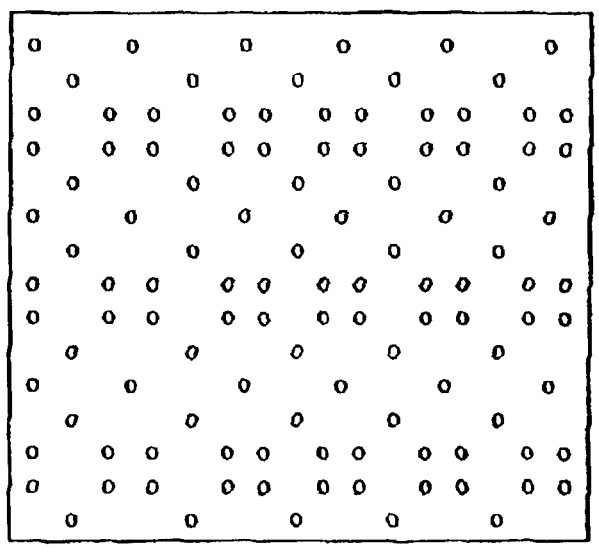
FIG. 3A is a mask pattern according to one embodiment of the present invention.
Figure 3B:
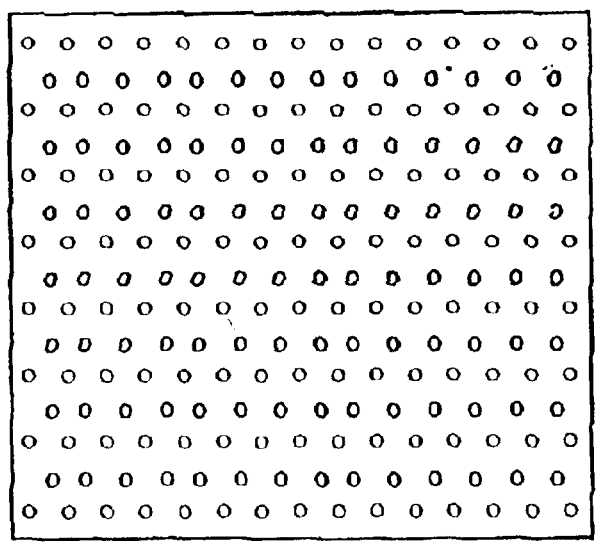
FIG. 3B is a mask pattern according to another embodiment of the present invention.
Figure 3C:
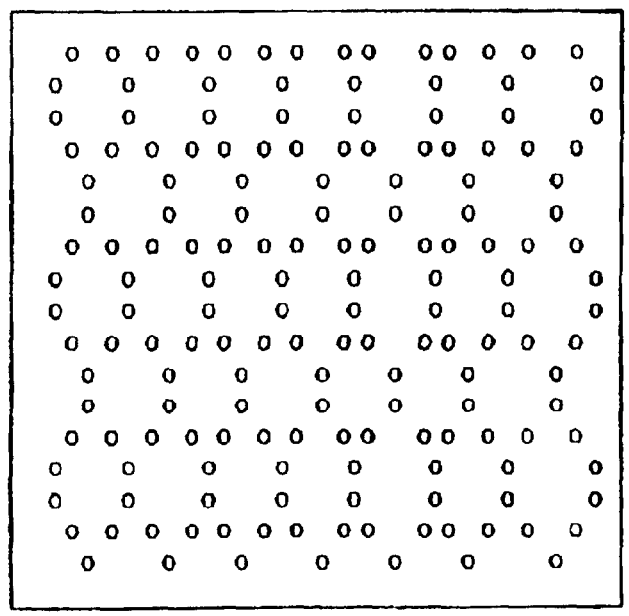
FIG. 3C is a mask pattern according to another embodiment of the present invention.
Figure 3D:
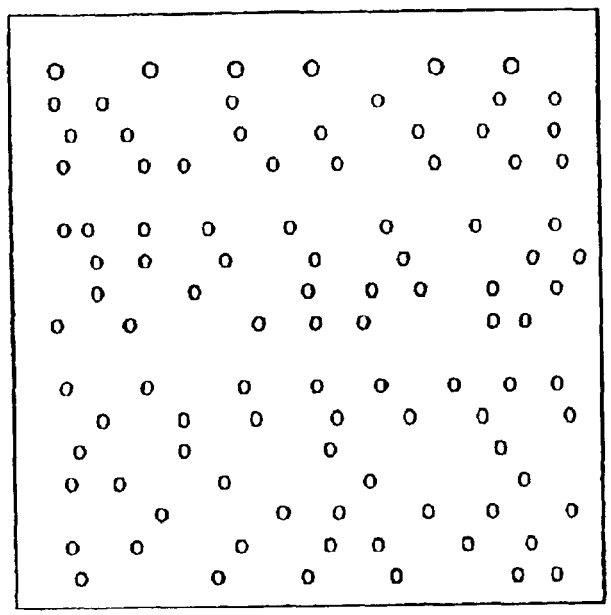
FIG. 3D is a mask pattern according to another embodiment of the present invention.

The spatial arrangement of unmasked areas may be chosen from a number of irregular patterns, examples of which are shown in FIGS. 3A–3D. A pattern that allows the reduction of ESR, the maintenance of strength and the maintenance of capacitance is preferred for the mask. The pattern is configured in such a way that the enhanced area does not create large scale strength defects such as perforation holes, divots, chunk removal and the like. The exposed area can be as little as about 10% of the total foil area to as much as about 95% of the total foil area, and is preferably about 30% to about 70% of the total foil area. FIG. 3A represents a regularly patterned array. FIG. 3B represents a hexagonal close packed array pattern. FIG. 3C represents a torus array pattern. FIG. 3D represents a random array pattern. Other patterns can also be used, as would be apparent to one skilled in the art, such that the mask and pattern are chosen to optimize the etch area as compared to the masked area to achieve the full benefit of the present invention. In the preferred embodiment, the mask is held tight around the whole foil and the edges of the foil are blocked from the electrochemical drilling solution. Preferably, a thin mask having small tapered holes of less than 1 mm is used, to concentrate the applied current density and to allow bubbles formed during the electrochemical drilling process to escape easier.

Next, the foil may be rinsed in an overflow deionized (DI) water bath for a time of about 1 to about 10 minutes, preferably about 1.5 minutes.

The foil pores are then widened in a chloride or nitrate containing electrolyte solution known to those skilled in the art, such as that disclosed in U.S. Pat. Nos. 3,779,877 and 4,525,249. Then the foil is dipped into a deionized water bath at a temperature of about 80° C. to about 100° C., preferably about 95° C., to form a hydrate layer on the foil surface.

Next, a barrier oxide layer can optionally be electrochemically formed onto one or both surfaces of the metal foil, sufficiently thick to support the intended use voltage, by placing the foil into a forming solution. Useful forming solutions include, but are not restricted to, a solution based on azelaic acid, sebacic acid, suberic acid, adipic acid, dodecanedioic acid, citric acid or other related organic acids and salts. Preferably, a citric acid solution is employed. This step is preferably conducted at a temperature of about 80° C. to about 100° C., preferably about 85° C., at a current density of about 1 mA/cm$^2$ to about 40 mA/cm$^2$, preferably about 16 mA/cm$^2$. A formation voltage of about 50 to about 800 Volts, preferably about 445 V, can be applied to the foil to form the barrier oxide layer. The barrier oxide layer provides a high resistance to current passing between the electrolyte and the metal foils, also referred to as the leakage current. A high leakage current can result in the poor performance and reliability of an electrolytic capacitor. In particular, a high leakage current results in greater amount of charge leaking out of the capacitor once it has been charged.

A heat treatment of 500° C.±20° C. may be applied to the foil following formation for about 1 to about 10 minutes, preferably about 4 minutes. The foil is then returned to the forming solution and allowed to soak with no applied potential for about 1 to about 10 minutes, preferably about 2 minutes. A second formation in the same electrolytic forming solution at high temperature is performed at a potential of about 435 Volts.

Next, the foils are dipped in a suitable low concentration, oxide-dissolving acid solution, including but not restricted to, phosphoric acid, formic acid, acetic acid, citric acid, oxalic acid, and acids of the halides, preferably phosphoric acid, at an acid concentration of about 1% to about 10% by weight, preferably a concentration of about 2% by weight, at a temperature of about 60° C. to about 90° C., preferably about 70° C., for a time of about 1 to about 10 minutes, preferably about 4 minutes.

Finally, the foils are reformed at a voltage of about 435 Volts in a suitable forming solution, as discussed above, at a high temperature, preferably about 80° C. to about 100° C., more preferably about 85° C.

Anode foil etched according to the present invention, when used in a multiple anode stack configuration, will exhibit an ESR reduction of about 30 to about 65% compared to a multiple anode stack configuration capacitor without the porous anodic foil of the present invention, while maintaining the high capacitance gain produced by the etching and widening steps alone. The porous foil produced by the present invention is suitable for commercial use in an electrolytic capacitor with a multiple anode stack or wound roll configuration. Thus, the invention is further directed to an electrolytic capacitor having porous anode foil provided by the three step etch process of the present invention.

Anode foils that are processed according to the method of the present invention described above can be utilized for a variety of applications that require a high capacitance anode foil. For example, as discussed above, anode foils are widely utilized in electrolytic capacitors, such as those described in U.S. Pat. No. 5,131,388 and U.S. Pat. No. 5,584,890, incorporated herein by reference. Electrolytic capacitors, which are manufactured with anode foils etched according to the present invention, can obtain a given capacity with a smaller volume than currently available electrolytic capacitors and, therefore, can be very compact in size.

Electrolytic capacitors manufactured with anode foils etched according to the present invention can be utilized in ICDs, such as those described in U.S. Pat. No. 5,522,851, incorporated by reference herein in its entirety, such that the increased capacitance per unit volume of the electrolytic capacitor allows for a reduction in the size of the ICD. Thus, the invention is further directed to an ICD utilizing an electrolytic capacitor having porous anode foil provided by the three step etch process of the present invention.

Having now generally described the invention, the same will be more readily understood through reference to the following examples which are provided by way of illustration, and are not intended to be limiting of the present invention.

EXAMPLES

Example 1

Sample etched aluminum anode foils were electrochemically drilled according to the present invention. The aluminum foils were placed into a 5.0% NaCl electrolyte etch solution at a temperature of 85° C. for 30 seconds with varying concentrations of phosphoric acid, $H_3PO_4$, and at various current densities, as shown in Table 1, below. The etched foil was then subjected to a pore widening process and then the foil is formed. According to the present invention, a porous, high capacitance foil was produced. By way of comparison, an aluminum foil etched and widened without use of the electrochemical drill according to the present invention was found to have a porosity (measured as the time required to pass 20 mL of $H_2O$ through the foil) of 19 seconds and a capacitance of 1.283 $\mu F/cm^2$. Additionally, for comparison, etched aluminum foil was mechanically drilled to create pores in the foil surface, resulting in a porosity (measured as the time required to pass 20 mL of $H_2O$ through the foil) of 17 seconds and a capacitance of 1.287 $\mu F$.

TABLE 1

| Sample # | $H_3PO_4$ Concentration (ppm) | Current Density (amps/cm²) | Electrochemical Drill Charge (coulombs) | Porosity (sec)* | Capacitance ($\mu F/cm^2$) |
|---|---|---|---|---|---|
| 917 | 0 | 0.1 | 3 | 25 | 1.347 |
| 918 | 0 | 0.2 | 6 | 18 | 1.343 |
| 919 | 0 | 0.3 | 9 | 16 | 1.364 |
| 920 | 10 | 0.1 | 3 | 13 | 1.384 |
| 921 | 10 | 0.2 | 6 | 13 | 1.355 |
| 922 | 10 | 0.3 | 9 | 13 | 1.335 |
| 923 | 50 | 0.1 | 3 | 16 | 1.360 |
| 924 | 50 | 0.2 | 6 | 15 | 1.347 |
| 925 | 50 | 0.3 | 9 | 14 | 1.310 |
| 926 | 100 | 0.1 | 3 | 16 | 1.273 |
| 927 | 100 | 0.2 | 6 | 15 | 1.339 |
| 928 | 100 | 0.3 | 9 | 16 | 1.326 |
| 929 | 500 | 0.1 | 3 | 14 | 1.310 |
| 930 | 500 | 0.2 | 6 | 14 | 1.347 |
| 931 | 500 | 0.3 | 9 | 18 | 1.355 |
| 932 | 1000 | 0.1 | 3 | 13 | 1.376 |
| 933 | 1000 | 0.2 | 6 | 16 | 1.351 |
| 934 | 1000 | 0.3 | 9 | 15 | 1.302 |
| 935 | 5000 | 0.1 | 3 | 15 | 1.380 |
| 936 | 5000 | 0.2 | 6 | 14 | 1.326 |
| 937 | 5000 | 0.3 | 9 | 16 | 1.343 |

*Porosity is measured as the time required to pass 20 mL of $H_2O$ through the foil.

Example 2

Sample etched aluminum anode foils were electrochemically drilled according to the present invention. The aluminum foils were placed into a 5.0% NaCl electrolyte etch solution with 1000 ppm phosphoric acid, $H_3PO_4$, at a current density of 0.15 amps/cm². The etch charge and temperature were varied, as shown in Table 2, below. The etched foil was then widened and formed. According to the present invention, a porous, high capacitance foil was produced.

TABLE 2

| Sample # | Electrochemical Drill Charge (coulombs) | Temp. (° C.) | Time (sec) | Porosity* | Capacitance ($\mu F/cm^2$) |
|---|---|---|---|---|---|
| 1861 | 30 | 60 | 200 | 13 | 1.217 |
| 1862 | 20 | 60 | 133.3 | 19 | 1.268 |
| 1863 | 20 | 50 | 133.3 | 16 | 1.240 |
| 1864 | 20 | 60 | 133.3 | 16 | 1.236 |
| 1865 | 10 | 50 | 66.7 | 20 | 1.276 |
| 1866 | 20 | 70 | 133.3 | 18 | 1.256 |
| 1867 | 30 | 50 | 200 | 14 | 1.220 |
| 1868 | 10 | 70 | 66.7 | 21 | 1.300 |
| 1869 | 30 | 70 | 200 | 11 | 1.287 |
| 1870 | 10 | 60 | 66.7 | 20 | 1.280 |

*Porosity is measured as the time required to pass 20 mL of $H_2O$ through the foil.

Based upon these experiments, the etched anode foil electrochemically drilled according to the present invention, as compared to the mechanically drilled foil and the non-drilled foil, exhibited a higher porosity (for example, sample #1869 exhibited a porosity of 11 seconds as compared to 17 seconds and 19 seconds, respectively for the mechanically drilled and non-drilled foils) at approximately the same capacitance (for example, sample #1869 exhibited a capacitance of 1.287 $\mu F$, as compared to 1.287 $\mu F$ and 1.283 $\mu F$, respectively for the mechanically drilled and non-drilled foils).

Example 3

Sample etched aluminum anode foils were electrochemically drilled according to the present invention. The aluminum foils were placed into a 5.0% NaCl electrolyte etch solution with 500 ppm sodium nitrate, $NaNO_3$, at a current density of 0.15 amps/cm². The etch charge and temperature were varied, as shown in Table 3, below. The etched foil was then widened and formed. According to the present invention, a porous, high capacitance foil was produced. By way of comparison, an aluminum foil etched and widened without use of the electrochemical drill according to the present invention was found to have a porosity (measured as the time required to pass 20 mL of $H_2O$ through the foil) of 20 seconds and a capacitance of 1.234 $\mu F/cm^2$.

TABLE 3

| Sample # | Electrochemical Drill Charge (coulombs) | Temp. (° C.) | Time (min) | Porosity* | Capacitance ($\mu F$) |
|---|---|---|---|---|---|
| 2090 | 36 | 70 | 4.0 | 9 | 1.200 |
| 2094 | 31.5 | 60 | 3.5 | 11 | 1.134 |
| 2099 | 27 | 90 | 3 | 10 | 1.222 |
| 2100 | 18 | 90 | 2 | 11 | 1.276 |
| 2104 | 9 | 90 | 1 | 16 | 1.295 |
| 2105 | 31.5 | 70 | 3.5 | 11 | 1.150 |

*porosity is measured as the time required to pass 20 mL of $H_2O$ through the foil.

Example 4

Sample etched aluminum anode foils were electrochemically drilled according to the present invention. The aluminum foils were placed into a 5.0% NaCl electrolyte etch solution with 500 ppm sodium nitrate, NaNO$_3$, at an etch charge of 18 coulombs and a temperature of 95° C. The current density was varied, as shown in Table 4, below. The etched foil was then widened and formed. According to the present invention, a porous, high capacitance foil was produced. Multiple anode capacitors were thereafter produced with the electrochemically drilled foil and capacitance and equivalent series resistance (ESR) for 4 and 5 anode configurations were obtained, as shown in Table 4, below.

By way of comparison, an aluminum foil etched and widened without use of the electrochemical drill according to the present invention was found to have a capacitance of 23.858 µF and an ESR of 22.79 Ω in a four anode configuration and a capacitance of 29.238 µF and an ESR of 19.29 Ω in a five anode configuration.

TABLE 4

| Sample # | Current Density (amps/cm$^2$) | Time (sec) | Cap. (µF/Cm$^2$) | Four Anode Stack Cap. (µF) | ESR (Ω) | Five Anode Stack Cap. (µF) | ESR (Ω) |
|---|---|---|---|---|---|---|---|
| 1481 | 0.15 | 120 | 1.417 | 21.953 | 9.15 | 27.182 | 10.78 |
| 1482 | 0.18 | 100 | 1.445 | 26.520 | 10.20 | — | — |
| 1483 | 0.20 | 90 | — | 26.697 | 7.396 | 32.636 | 8.787 |
| 1484 | 0.18 | 100 | 1.429 | 22.255 | 10.81 | 27.662 | 11.87 |
| 1485 | 0.25 | 72 | 1.429 | 26.105 | 7.797 | 31.127 | 10.88 |
| 1486 | 0.30 | 60 | 1.449 | 26.990 | 9.045 | 33.935 | 12.87 |
| 1490 | 0.20 | 90 | 1.417 | 23.299 | 8.121 | 28.369 | 9.435 |
| 1491 | 0.25 | 72 | 1.425 | 26.198 | 8.857 | 32.661 | 9.086 |

Example 5

Sample etched aluminum anode foils were electrochemically drilled according to the present invention. The aluminum foils were placed into a 5.0% NaCl electrolyte etch solution with 500 ppm sodium nitrate, NaNO$_3$, at a current density of 0.20 amps/cm$^2$ and a temperature of 95° C. The charge was varied, as shown in Table 5, below. The etched foil was then widened and formed. According to the present invention, a porous, high capacitance foil was produced. Multiple anode capacitors were produced with the electrochemically drilled foil and capacitance and equivalent series resistance (ESR) for 4 and 5 anode configurations were obtained, as shown in Table 5, below.

TABLE 5

| Samp. # | ECD Chart (coulombs) | Cap. (µF/cm$^2$) | Four Anode Stack Cap. (µF) | ESR (Ω) | Five Anode Stack Cap. (µF) | ESR (Ω) |
|---|---|---|---|---|---|---|
| 8 | 12 | 1.333 | 20.116 | 32.31 | 22.383 | 36.67 |
| 12 | 12 | 1.405 | 22.828 | 23.73 | 26.138 | 26.53 |
| 15 | 18 | 1.327 | 21.020 | 27.62 | 24.656 | 28.05 |
| 16 | 18 | 1.370 | 24.408 | 12.61 | 28.602 | 19.21 |
| 19 | 12 | 1.280 | 18.822 | 33.95 | 20.335 | 41.22 |
| 32 | 18 | 1.371 | 23.173 | 14.321 | 27.961 | 15.94 |
| 35 | 18 | 1.394 | 22.775 | 13.29 | 28.100 | 15.38 |
| 55 | 18 | 1.414 | 26.139 | 9.507 | 32.171 | 10.48 |
| 56 | 18 | 1.406 | 25.369 | 11.74 | 31.041 | 13.70 |
| 67 | 24 | 1.368 | 24.058 | 18.59 | 28.833 | 20.15 |
| 73 | 24 | 1.360 | 26.098 | 11.06 | 31.071 | 13.76 |
| 78 | 12 | 1.369 | 25.764 | 13.17 | 31.508 | 15.58 |
| 81 | 18 | 1.364 | 26.349 | 9.504 | 31.915 | 12.28 |
| 84 | 24 | 1.374 | 24.383 | 7.976 | 29.067 | 10.98 |
| 89 | 24 | 1.402 | 24.829 | 10.84 | 30.601 | 12.31 |
| 100 | 18 | 1.391 | 25.300 | 9.412 | 30.375 | 13.81 |
| 109 | 12 | 1.352 | 19.345 | 37.37 | 18.580 | 47.92 |

TABLE 5-continued

| Samp. # | ECD Chart (coulombs) | Cap. (µF/cm$^2$) | Four Anode Stack Cap. (µF) | ESR (Ω) | Five Anode Stack Cap. (µF) | ESR (Ω) |
|---|---|---|---|---|---|---|
| 122 | 18 | 1.397 | 16.786 | 27.42 | 23.830 | 37.21 |
| 126 | 18 | 1.370 | 25.997 | 11.63 | 30.002 | 16.61 |
| 127 | 24 | 1.400 | 25.141 | 17.52 | 29.432 | 21.18 |
| 128 | 12 | 1.365 | 20.062 | 30.40 | 23.308 | 32.51 |
| 132 | 12 | 1.407 | 21.531 | 22.09 | 23.650 | 32.79 |
| 140 | 18 | 1.385 | 24.228 | 18.79 | 28.990 | 20.55 |
| 144 | 24 | 1.379 | 24.894 | 6.903 | 30.722 | 7.866 |
| 146 | 18 | 1.396 | 23.958 | 12.19 | 29.514 | 13.58 |
| 150 | 18 | 1.355 | 20.564 | 29.71 | 23.268 | 33.86 |
| 153 | 12 | 1.403 | 25.193 | 12.87 | 30.796 | 13.89 |
| 163 | 24 | 1.385 | 25.031 | 18.26 | 30.048 | 15.93 |
| 166 | 18 | 1.396 | 23.358 | 16.65 | 28.547 | 16.71 |
| 179 | 24 | 1.412 | 23.793 | 11.33 | 30.499 | 14.82 |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for creating a porous anode foil, comprising:
   (a) etching a metal foil;
   (b) electrochemically drilling said metal foil in an electrochemical drilling solution; and
   (c) widening pores generated in said metal foil by steps (a) and (b).

2. A method according to claim 1, wherein said electrochemical drilling solution comprises about 1% to about 15% by weight sodium chloride and about 10 PPM to about 5000 PPM of a surface passivator.

3. A method according to claim 2, wherein said electrochemical drilling solution comprises about 5% by weight sodium chloride and about 500 PPM of a surface passivator.

4. A method according to claim 2, wherein said surface passivator is selected from the group consisting of alkali metal salts of nitrate, alkali metal salts of phosphate, soluble silicates of sulfate and alkali metal salts of sulfate.

5. A method according to claim 1, wherein step (b) is performed at a constant current density of about 0.1 amp/cm² to about 1.0 amp/cm² for a duration of about five seconds to about 15 minutes.

6. A method according to claim 1, wherein the resulting pore size of said anode foil is about 1 micron to about 1000 microns in diameter.

7. A method according to claim 1, wherein the resulting pore spacing of said anode foil is about 1 micron to about 100,000 microns between pore centers.

8. A method according to claim 1, further comprising placing a mask with a grid of openings over said anode foil between steps (a) and (b) so that only unmasked areas of said anode foil are exposed to the electrochemical drilling solution during step (b).

9. A method according to claim 8, wherein said mask exposes about 10% to about 95% of the total area of said foil.

10. A method according to claim 9, wherein said mask exposes about 30% to about 70% of the total area of said foil.

11. A method according to claim 1, wherein step (a) comprises etching said anode foil in an electrolyte etch solution consisting of about 1.3% by weight NaCl and about 3.5% by weight $NaClO_4$.

12. A method according to claim 1, wherein step (a) comprises etching said anode foil in an electrolyte etch solution at a temperature of about 80° C. to about 100° C.

13. A method according to claim 1, wherein step (a) comprises etching said anode foil in an electrolyte etch solution a current density of about 0.1 amps/cm² to about 0.3 amps/cm².

14. A method according to claim 1, wherein step (a) comprises etching said anode foil in an electrolyte etch solution at an etch charge of about 5 coulombs/cm² to about 50 coulombs/cm².

15. A method according to claim 1, wherein step (c) comprises widening said anode foil in a chloride or nitrate containing electrolyte solution.

16. A method according to claim 1, further comprising:
    (d) electrochemically forming a barrier oxide layer onto a surface of the anode foil to support the intended use voltage.

17. A method according to claim 1, wherein step (b) is performed after step (a).

18. A method for creating a porous anode foil, comprising:
    (a) etching a metal foil;
    (b) electrochemically drilling said etched metal foil in an electrochemical drilling solution; and
    (c) widening pores generated in said metal foil by steps (a) and (b).

19. A method for creating a porous anode foil, comprising:
    (a) etching a metal foil in an etch solution;
    (b) electrochemically drilling said etched metal foil in an electrochemical drilling solution comprising about 1% to about 15% by weight sodium chloride and about 10 PPM to about 5000 PPM sodium nitrate; and
    (c) widening pores generated in said metal foil by steps (a) and (b).

20. A method according to claim 19, wherein step (a) comprises etching said anode foil in an electrolyte etch solution consisting of about 1.3% by weight NaCl and about 3.5% by weight $NaClO_4$.

* * * * *